United States Patent [19]

Anderson et al.

[11] 4,303,745
[45] Dec. 1, 1981

[54] CHEMICAL SCRUBBER UNIT FOR AN ELECTROCHEMICAL CELL

[75] Inventors: Robert M. Anderson, Lakeville; Carl R. Schlaikjer, Winchester; John S. Shambaugh, Holliston, all of Mass.

[73] Assignees: GTE Products Corp., Stamford, Conn.; GTE Laboratories Inc., Waltham, Mass.

[21] Appl. No.: 184,835

[22] Filed: Sep. 8, 1980

[51] Int. Cl.$^3$ ............................................. H01M 2/12
[52] U.S. Cl. ...................................................... 429/86
[58] Field of Search ..................... 429/86, 57, 105, 194; 423/242, 230; 422/238, 239; 210/DIG. 1; 55/387, 388

[56] References Cited

U.S. PATENT DOCUMENTS

| | | | |
|---|---|---|---|
| 2,615,062 | 10/1952 | Craig | 429/86 |
| 3,966,418 | 6/1976 | Frevel et al. | 423/242 A X |
| 4,167,578 | 9/1979 | Mehta et al. | 423/24 A X |

Primary Examiner—Anthony Skapars
Attorney, Agent, or Firm—Peter Xiarhos

[57] ABSTRACT

A chemical scrubber unit for containing and neutralizing toxic, corrosive thionyl chloride and sulfur dioxide acid fluids vented by a primary electrochemical cell. The scrubber unit includes an inlet tube coupled to the electrochemical cell by which thionyl chloride and sulfur dioxide vented by the cell is conveyed to an elongated, generally rectangular distribution trap disposed within a housing of the scrubber unit. The distribution trap contains sodium carbonate or sodium bi-carbonate for reacting chemically with and neutralizing thionyl chloride vented by the cell and received within the trap and is itself surrounded within the housing by soda lime for chemically reacting with and neutralizing both sulfur dioxide and thionyl chloride vented by the cell and received within the trap. The distribution trap distributes and disseminates thionyl chloride and sulfur dioxide received thereby over a substantial volume for increasing the exposure of the thionyl chloride and sulfur dioxide to the neutralizing materials (sodium carbonate or sodium bi-carbonate and soda lime) thereby increasing the material utilization of the neutralizing materials.

23 Claims, 1 Drawing Figure

U.S. Patent  Dec. 1, 1981  4,303,745
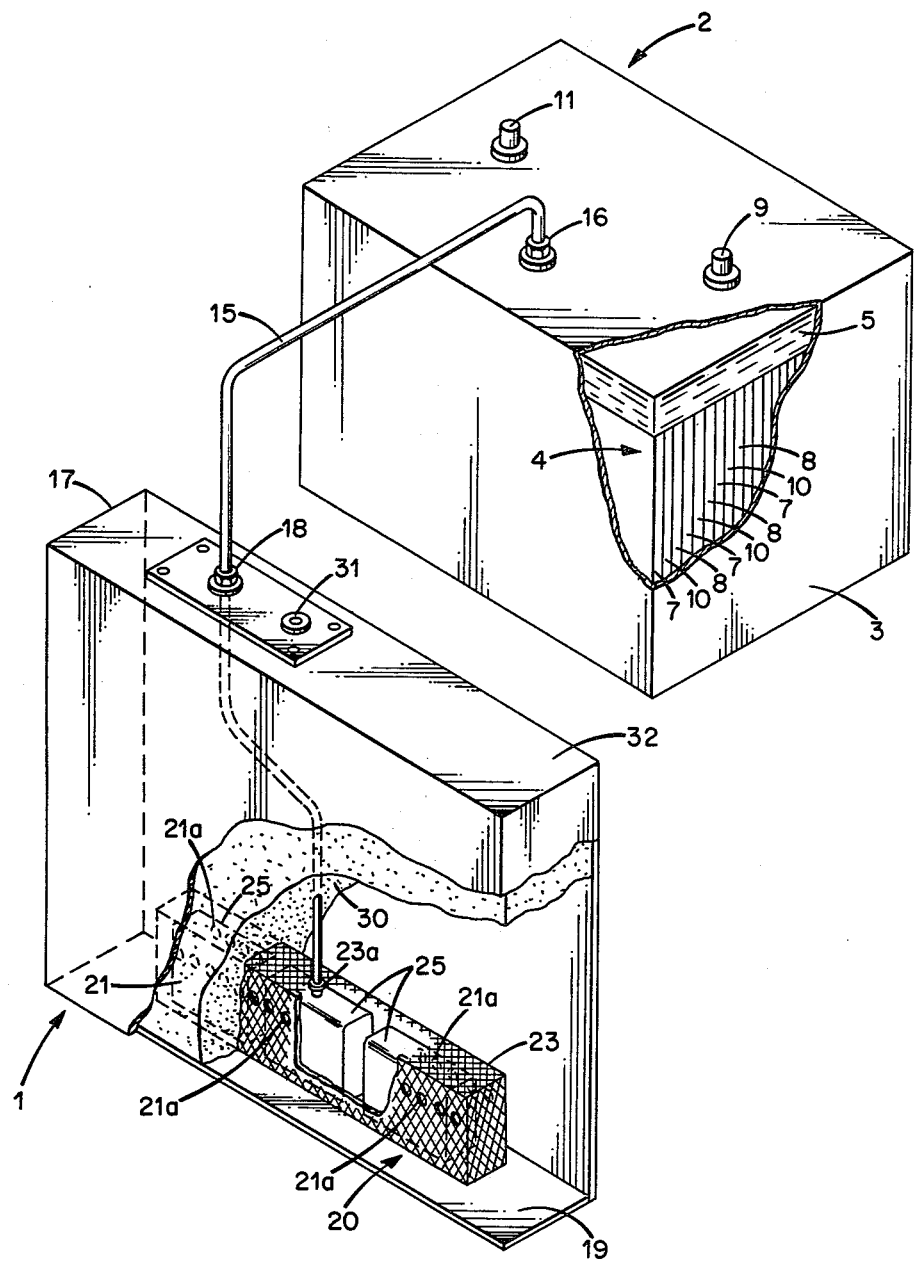

CHEMICAL SCRUBBER UNIT FOR AN ELECTROCHEMICAL CELL

BACKGROUND OF THE INVENTION

The present invention relates to a chemical scrubber unit and, more particularly, to a chemical scrubber unit for containing and neutralizing toxic, corrosive gases generated under certain conditions within a primary electrochemical cell.

Primary electrochemical cells are generally well known and understood by those skilled in the art. One particularly useful primary electrochemical cell, especially for high current drain applications, is a so-called prismatic primary electrochemical cell. Such a cell is described in detail in U.S. Pat. No. 4,086,397, in the names of Franz Goebel and Nikola Marincic, and includes a physically large battery stack enclosed together with an electrolytic solution within a large, generally rectangular metal (e.g., stainless steel) housing. The battery stack as used within the cell comprises a large number of generally rectangular cell components including a plurality of anodes, carbon cathode current collector electrodes, and insulative separators (e.g., of fiberglass) between the anodes and the carbon cathode current collector electrodes. Each anode generally comprises a large rectangular sheet of an oxidizable alkali metal, such as lithium, physically impressed into a supporting metal (e.g., nickel) grid, and each of the carbon cathode current collector electrodes comprises an aggregation of porous, semi-rigid carbon globules or conglomerates physically impressed into a metal (e.g., nickel) current collector grid. A common and preferred electrolytic solution employed in the cell as described above is a cathodelectrolyte solution comprising a reducible soluble cathode such as thionyl chloride and an electrolyte solute such as lithium tetrachloroaluminate dissolved in the thionyl chloride.

By the appropriate selection of the battery cell components and materials, a cell as described above can be constructed to have any one of several possible sizes and energy configurations. A typical cell can, for example, have exterior dimensions of approximately 18 inches (height) × 13 inches (width) × 10 inches (depth), a weight of 156 pounds, an ampere-hour capacity rating of 10,000 ampere-hours, and a nominal discharge current of 40 amperes.

During the discharge cycle of a primary electrochemical cell having the above-described characteristics, it is possible under certain adverse conditions, such as abnormally high operating temperature conditions, for large amounts of gases to be generated in the cell as a result of the existence of the adverse conditions. These gases include sulfur dioxide and thionyl chloride and result in an increase in the internal pressure within the housing of the cell. While it is possible to design the housing so as to withstand the increased internal pressure resulting from the above-mentioned condition, this solution may be impractical or prohibited by design constraints of a particular cell application. It may also be possible to vent the gases to the atmosphere by way of a pressure relief valve so that the pressure is limited to a value below the safe structural limits of the cell housing. However, the gases (sulfur dioxide and thionyl chloride) are both toxic and corrosive. It may be desirable therefore to avoid this solution for applications where people are expected to be present or where the cell is to be used in conjunction with, or proximate to, apparatus which might be adversely affected or otherwise damaged by the corrosive nature of the gases.

BRIEF SUMMARY OF THE INVENTION

In accordance with the present invention, a chemical scrubber unit is provided for neutralizing acid fluids, for example, acid fluids such as thionyl chloride and sulfur dioxide vented by an electrochemical cell as discussed hereinabove. The chemical scrubber unit in accordance with the invention includes a housing within which a neutralizing material and a distribution means are disposed. The neutralizing material is capable of chemically reacting with and neutralizing acid fluids. The distribution means is disposed in proximity to the neutralizing material and is arranged to receive the acid fluids and to distribute the acid fluids within a predetermined volume and in contact with the neutralizing material for chemical reaction with and neutralization by the neutralizing material.

BRIEF DESCRIPTION OF THE DRAWING

Various objects, features and advantages of a chemical scrubber unit for an electrochemical cell will be apparent from a detailed discussion taken taken in conjunction with the accompanying drawing in which the single FIGURE illustrates, with portions broken away, a chemical scrubber unit in accordance with the present invention as employed in conjunction with a primary electrochemical cell.

DETAILED DESCRIPTION OF THE INVENTION

Referring now to the single FIGURE of the drawing, there is shown a chemical scrubber unit 1 in accordance with the present invention as employed in conjunction with a primary electrochemical cell 2. The primary electrochemical cell 2 with which the scrubber unit 1 is used is of a so-called prismatic type and, as shown in the drawing, generally includes a rectangular housing 3 within which a battery stack 4 is disposed together with an electrolytic solution 5. The housing 3 may be of stainless steel and have typical outer dimensions of approximately 18 inches (height) × 13 inches (width) × 10 inches (depth). The cell may have a weight of about 156 pounds. The battery stack 4 as employed within the housing 3 comprises a large number of generally rectangular cell components. These components include a plurality of anodes 7, carbon cathode current collector electrodes 8, and insulative separators 10 between the anodes 7 and the carbon cathode current collector electrodes 8. Although not specifically shown in the drawing, in a preferred form and construction of the battery stack 4, each of the anodes 7 comprises a large rectangular sheet of an oxidizable alkali metal, such as lithium, pressed into a supporting metal (e.g., nickel) grid, and each of the carbon cathode current collector electrodes 8 comprises an aggregation of porous semi-rigid carbon globules or conglomerates pressed into a metal (e.g., nickel) grid to be supported thereby. The grids of the electrodes 8 also collectively serve as a current collector member for the cell during the discharge cycle of the cell 2. The separators 10, which serve to electrically isolate the anodes 7 from the carbon cathode current collector electrodes 8, may be of a suitable insulative material such as fiberglass.

Although not shown in the drawing, the plurality of anodes 7 and the plurality of carbon cathode current collector electrodes 8 are coupled by way of associated terminal connection assemblies to corresponding electrical terminals 9 and 11 which, in turn, are coupled to an apparatus which is to be powered by the cell 2. The electrolytic solution 5 to which the battery stack 4 is exposed and which is compatible with the cell components as described hereinabove is preferably a cathodelectrolyte solution comprising a reducible soluble cathode such as thionyl chloride and an electrolyte solute such as lithium tetrachloroaluminate dissolved in the thionyl chloride.

In the cell 2 having the specific components and materials as described hereinabove, and as previously discussed, it is possible under certain adverse conditions, such as abnormally high operating temperature conditions, for large amounts of gases to be generated in the cell as a result of the existence of the adverse conditions. These gases are present during the electrochemical discharge reaction in the cell 2 and, for the abovementioned components and materials of the cell, include sulfur dioxide ($SO_2$) (which is a by-product of the electrochemical discharge) and thionyl chloride ($SOCl_2$). The substantial generation of gases results in an increase in the internal pressure of the cell 2. In addition, each of the sulfur dioxide and thionyl chloride gases is both toxic and corrosive and, therefore, desirably should not be vented directly to the atmosphere if people are expected to be present or the cell is to be used in conjunction with, or proximate to, apparatus which might be adversely affected or otherwise damaged by the corrosive nature of the gases. For most effective and efficient use of the cell 2, therefore, it is highly desirable that the increased pressure in the cell be alleviated while, at the same time, neutralizing the gases so as to eliminate or minimize the toxic and corrosive effects of the gases. These particular conditions are satisfied by the aforementioned chemical scrubber unit 1.

The chemical scrubber unit 1 in accordance with the invention and as shown in the drawing is connected to the cell 2 by way of a hollow inlet tube 15 through which gases vented by the cell 2 are conveyed to the scrubber unit 1 to be neutralized, or "scrubbed", thereby. The tube 15, which may be of any suitable material which is not corroded by or reacts chemically with the gases generated within the cell 2, for example, "Teflon", is connected at one end thereof to a fitting 16 of the cell 2 and enters a rectangular housing 17 of the scrubber unit 1 by way of a fitting 18 whereupon it extends downwardly through the housing 17 and enters via the other end thereof into an elongated trap or buffer 20. The trap 20 rests on a bottom wall 19 of the housing 17 and generally comprises a rectangular metal case 21, for example, of stainless steel, disposed within and surrounded by a generally rectangular fine mesh metal screen enclosure 33, for example, a 100-mesh stainless steel screen enclosure. The screen enclosure 23 has a centrally located opening 23a therein by which the tube 15 is able to enter the trap 20 and thereupon extend into the case 21 which, as shown in the drawing, is open at its top. The metal case 21 further has a plurality of openings 21a spaced about its periphery and includes therewithin a plurality of packets 25 spaced along its major dimension. Each of the packets 25 contain a material which is employed for neutralizing thionyl chloride vented by the cell 2. The packets 25 themselves are made of a porous material such as fiberglass. The trap 20 as described hereinabove is itself surrounded by a material 30 which completely fills the housing 17 and is employed for neutralizing sulfur dioxide and thionyl chloride vented by the cell 2.

Since both the thionyl chloride and sulfur dioxide are acidic in nature, the material within the packets 25 and the material 30 outside of the trap 20 desirably should be chemically basic in nature. A suitable neutralizing material in the packets 25 for use in neutralizing thionyl chloride vented by the cell 2 is powdered sodium carbonate and a suitable material 30 for use in neutralizing both sulfur dioxide and thionyl chloride vented by the cell 2 is soda lime. An alternative material for use in the packets 25 is sodium bi-carbonate. Soda lime is a standard granulated mixture of calcium oxide with sodium or potassium hydroxide and calcium hydroxide.

In the operation of the trap 20, the sulfur dioxide and thionyl chloride gases entering the case 21 by way of the tube 15 is distributed or disseminated within and throughout the volume of the trap 20 so as to be placed in contact with the packets 25 and the soda lime material 30 surrounding the trap 20. The distribution of the sulfur dioxide and thionyl chloride over the entire interior region of the trap 20 insures substantial material utilization of the soda lime material 30 and, as will be discussed in greater detail hereinafter, the sodium carbonate in the packets 25. Suitable dimensions for the trap 20 are 2 inches (height) $\times 10\frac{3}{8}$ inches (width) $\times \frac{7}{8}$ inch (depth).

The sulfur dioxide and thionyl chloride escaping past the trap 20 into the soda lime material 30 reacts chemically with the soda lime material 30 to produce, inter alia, a variety of non-volatile solid salts and water. By virtue of the large size of the trap 20 as discussed hereinabove, the water makes contact with a substantial surface area of the soda lime material 30, resulting in a minimal formation of a paste by the direct interaction of the water with the soda lime material 30. By contrast, a substantial amount of paste would be formed, in a highly localized area, if the tube 15 were to be directly inserted into a mass of the soda lime material. The result of this latter situation would be a clogging of the tube at the region or point of entry of the tube into the soda lime material. The trap 20 minimizes the occurrence or possibility of this adverse type of situation.

The water formed by reaction of the sulfur dioxide and thionyl chloride with the soda lime material 30 as described hereinabove is chemically absorbed by the soda lime material. When the soda lime material 30 nearest to the trap 20 has become saturated with water, some of this water migrates or seeps back into the case 21 and comes into physical contact with the packets 25. This contact significantly increases the reactivity rate and efficacy of the sodium carbonate in the packets 25 in neutralizing thionyl chloride in the case 21. (In the event sodium bi-carbonate is used in the packets 25, the reaction of thionyl chloride with the sodium bi-carbonate is more or less immediate upon coming into contact with the sodium bi-carbonate). The distribution of the thionyl chloride over the entire interior region of the case 21 as mentioned hereinabove insures substantial utilization of the material in the packets 25. The reaction of the thionyl chloride with sodium carbonate in the packets 25 results in the generation of reaction products, including carbon dioxide, which passes through the open top and the openings 21a in the case 21 and through the enclosure screen 23 and comes into direct physical contact with the soda lime material 30. The carbon dioxide of the reaction products reacts with the soda lime material 30 situated farther away from the trap 20, in the same manner as earlier described, so as to be absorbed and neutralized by the soda lime material 30.

The case 21 having the packets 25 therewithin as described hereinabove may also be used in the event the thionyl chloride entering the trap 20 is in the form of a liquid or condensate. The liquid or condensate form of the thionyl chloride may result, for example, if thionyl chloride gas venting from the cell 2 comes in contact with cool surfaces, for example, cool walls of the tube 15. In such a case, the liquid thionyl chloride collects in the case 21 and, in the same manner as previously described, reacts chemically with the material in the packets 25 to produce gaseous reaction products which escape from the case by way of the open top and the openings 21a and then through the screen enclosure 23 to the soda lime material 30. In the event a substantial quantity of such liquid thionyl chloride enters the trap 20, it is prevented from completely filling the case 21 by virtue of the openings 21a and the open top of the case 21. In this case, the excess of the liquid thionyl chloride escapes by way of the openings 21a and the open top of the case 21 and thereupon escapes by way of the screen enclosure 23 directly into the soda lime material 30. The liquid thionyl chloride escaping past the screen enclosure 23 will, in the same manner as previously described, react chemically with the soda lime material 30 to produce a variety of reaction products (including non-volatile solid salts and water).

The material utilization of the sodium carbonate (or sodium bi-carbonate) and soda lime material is further increased in accordance with the present invention by the utilization of a one-way breather valve 31 in a top wall 32 of the housing 17. The valve 31 maintains a positive pressure inside the housing 17 to insure that the gases exiting from the trap 20 go to all parts of the soda lime material 30 and reacts with all, or nearly all, of the soda lime material 30. The breather valve 31, which is preferably rated at 1 psig, also allows the escape or venting to the atmosphere of expanded air (and possibly some carbon dioxide gas) resulting from the exothermic nature of the reaction of the thionyl chloride and sulfur dioxide with the neutralizing materials as discussed hereinabove. This venting occurs when the pressure in the housing 17 reaches or exceeds 1 psig. Suitable dimensions for the housing 17 as described hereinabove are approximately $11\frac{1}{8}$ inches (height)+12 inches (width)×2 inches (depth).

While there has been described what is considered to be a preferred embodiment of the invention, it will be apparent to those skilled in the art that various changes and modifications may be made therein without departing from the invention as called for in the appended claims.

We claim:

1. A chemical scrubber unit for neutralizing acid fluids, comprising:
   a housing;
   neutralizing material disposed within the housing capable of chemically reacting with and neutralizing acid fluids; and
   distribution means disposed within the housing in proximity to the neutralizing material and arranged to receive the acid fluids and to distribute the acid fluids within a predetermined volume and in contact with the neutralizing material for chemical reaction with and neutralization by the neutralizing material.

2. A chemical scrubber unit in accordance with claim 1 wherein:
   the acid fluids include thionyl chloride and sulfur dioxide.

3. A chemical scrubber unit in accordance with claim 2 wherein:
   the neutralizing material includes soda lime and a material selected from the group consisting of sodium carbonate and sodium bi-carbonate.

4. A chemical scrubber unit in accordance with claim 2 wherein the distribution means comprises:
   inlet means for receiving and conveying thionyl chloride and sulfur dioxide; and
   trap means coupled to the inlet means proximate to the neutralizing material and enclosing a predetermined volume, said trap means being operative to receive thionyl chloride and sulfur dioxide from the inlet means and to distribute the thionyl chloride and sulfur dioxide within the predetermined volume and in contact with the neutralizing material for chemical reaction with and neutralization by the neutralizing material.

5. A chemical scrubber unit in accordance with claim 4 wherein:
   the trap means comprises:
   a first container arranged to receive thionyl chloride and sulfur dioxide from the inlet means and having openings therein by which the thionyl chloride and sulfur dioxide may pass, and
   a second container surrounding the first container and having openings therein by which thionyl chloride and sulfur dioxide may pass; and
   the neutralizing material comprises:
   a first neutralizing material disposed within the first container for chemical reaction with and neutralization of thionyl chloride received in the first container, and
   a second neutralizing material disposed within the housing and surrounding the second container for chemical reaction with and neutralization of sulfur dioxide and thionyl chloride passing through the openings in the second container.

6. A chemical scrubber unit in accordance with claim 5 wherein:
   the first neutralizing material includes a material selected from the group consisting of sodium carbonate and sodium bi-carbonate.

7. A chemical scrubber unit in accordance with claim 5 wherein:
   the second neutralizing material includes soda lime.

8. A chemical scrubber unit in accordance with claim 5 wherein:
   the first neutralizing material includes a material selected from the group consisting of sodium carbonate and sodium bi-carbonate; and
   the second neutralizing material includes soda lime.

9. A chemical scrubber unit in accordance with claim 5 wherein:
   the first neutralizing material is contained within a plurality of porous packets disposed in a spaced-apart fashion within the first container.

10. A chemical scrubber unit in accordance with claim 8 wherein:
    the first container is a generally rectangular metal case having an open top by which the inlet means extends into the case and further having a plurality of openings in the walls of the case.

11. A chemical scrubber unit in accordance with claim 10 wherein:
the second container is a generally rectangular enclosure of metal screen material and having an opening therein by which the inlet means passes for purposes of insertion into the first container.

12. A chemical scrubber unit in accordance with claim 11 wherein:
the first neutralizing material includes a material selected from the group consisting of sodium carbonate and sodium bi-carbonate.

13. A chemical scrubber unit in accordance with claim 11 wherein:
the second neutralizing material includes soda lime.

14. A chemical scrubber unit in accordance with claim 11 wherein:
the first neutralizing material includes a material selected from the group consisting of sodium carbonate and sodium bi-carbonate; and
the second neutralizing material includes soda lime.

15. A chemical scrubber unit in accordance with claim 11 further comprising:
means associated with the housing for maintaining a positive pressure within the housing for increasing the material utilization of the first and second neutralizing materials.

16. In combination:
an apparatus operative under certain conditions to vent thionyl chloride and sulfur dioxide; and
a chemical scrubber unit interconnected with the aforesaid apparatus for receiving and neutralizing thionyl chloride and sulfur dioxide vented by the apparatus, said chemical scrubber unit comprising:
a housing,
neutralizing material disposed within the housing capable of chemically reacting with and neutralizing thionyl chloride and sulfur dioxide, and
distribution means disposed within the housing in proximity to the neutralizing material and arranged to receive thionyl chloride and sulfur dioxide vented by the apparatus, said distribution means being operative to distribute thionyl chloride and sulfur dioxide received thereby within a predetermined volume and in contact with the neutralizing material for chemical reaction with and neutralization by the neutralizing material.

17. The combination in accordance with claim 16 wherein: the apparatus includes an electrochemical cell.

18. The combination in accordance with claim 17 wherein the distribution means comprises:
inlet means for receiving and conveying thionyl chloride and sulfur dioxide; and
trap means coupled to the inlet means proximate to the neutralizing material and enclosing a predetermined volume, said trap means being operative to receive thionyl chloride and sulfur dioxide from the inlet means and to distribute the thionyl chloride and sulfur dioxide within the predetermined volume and in contact with the neutralizing material for chemical reaction with and neutralization by the neutralizing material.

19. The combination in accordance with claim 18 wherein: the trap means comprises:
a first container arranged to receive thionyl chloride and sulfur dioxide from the inlet means and having openings therein by which the thionyl chloride and sulfur dioxide may pass, and
a second container surrounding the first container and having openings therein by which thionyl chloride and sulfur dioxide may pass; and
the neutralizing material comprises:
sodium carbonate contained within a plurality of packets disposed in a spaced-apart fashion within the first container for chemical reaction with and neutralization of thionyl chloride received in the first container, and
soda lime disposed within the housing and surrounding the second container for chemical reaction with and neutralization of sulfur dioxide and thionyl chloride passing through the openings in the second container.

20. The combination in accordance with claim 19 wherein:
the first container is a generally rectangular metal case having an open top by which the inlet means extends into the case and further having a plurality of openings in the walls of the case; and
the second container is a generally rectangular enclosure of a metal screen material and having an entrance opening therein by which the inlet means passes for purposes of insertion into the first container.

21. The combination in accordance with claim 20 wherein:
the inlet means includes a tube of a material chemically non-reactive with thionyl chloride and sulfur dioxide.

22. The combination in accordance with claim 20 wherein:
the housing is of a generally rectangular configuration and includes a top wall and a bottom wall;
the trap means rests on the bottom wall of the housing;
the tube of the inlet means extends from the top wall of the housing, into the entrance opening of the second container of the trap means, and into the open top of the first container of the trap means; and
the soda lime surrounds the tube of the inlet means and the trap means to the top wall of the housing.

23. The combination in accordance with claim 22 further comprising:
pressure means located in the top wall of the housing for maintaining a positive pressure within the housing for increasing the material utilization of the sodium carbonate and soda lime.

* * * * *